(12) United States Patent
Lee et al.

(10) Patent No.: US 11,654,851 B2
(45) Date of Patent: May 23, 2023

(54) VEHICLE AIRBAG SYSTEM AND CONTROL METHOD

(71) Applicant: HYUNDAI MOBIS CO., LTD., Seoul (KR)

(72) Inventors: Seok Min Lee, Yongin-si (KR); Hae Kwon Park, Yongin-si (KR); Ga Ram Jeong, Yongin-si (KR); Dong Oh Lee, Yongin-si (KR); Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/396,807

(22) Filed: Aug. 9, 2021

(65) Prior Publication Data

US 2022/0063537 A1 Mar. 3, 2022

(30) Foreign Application Priority Data

Aug. 25, 2020 (KR) .......................... 10-2020-0107334

(51) Int. Cl.
*B60R 21/205* (2011.01)
*B60R 21/214* (2011.01)
(Continued)

(52) U.S. Cl.
CPC ...... *B60R 21/01552* (2014.10); *B60R 21/015* (2013.01); *B60R 21/01554* (2014.10); *B60R 21/205* (2013.01); *B60R 21/214* (2013.01); *B60R 21/231* (2013.01); *B60R 2021/0032* (2013.01); *B60R 2021/01034* (2013.01); *B60R 2021/01211* (2013.01); *B60R 2021/23107* (2013.01); *B60R 2021/26058* (2013.01)

(58) Field of Classification Search
CPC . B60R 2021/23107; B60R 2021/01211; B60R 2021/26058; B60R 2021/0004; B60R 2021/0032; B60R 2021/01034; B60R 21/205; B60R 21/01552; B60R 21/01554; B60R 21/231; B60R 21/214; B60R 21/015; B60R 21/01231
USPC .......................... 280/728.1, 730.1, 732, 735
See application file for complete search history.

(56) References Cited

U.S. PATENT DOCUMENTS 10,081,323 B2 * 9/2018 Nagasawa ............. B60R 21/013
10,864,872 B2 * 12/2020 Sheldon ................ B60R 21/203
(Continued)

FOREIGN PATENT DOCUMENTS

DE   102017006274 B3 * 12/2018
DE   102019109441 A1 * 10/2020
(Continued)

*Primary Examiner* — Keith J Frisby
(74) *Attorney, Agent, or Firm* — NovoTechIP International PLLC (57) ABSTRACT

A vehicle airbag system is proposed. The vehicle airbag system includes: a front airbag mounted to a portion of a vehicle in front of a passenger and configured to be unfolded toward a front of the passenger; an upper airbag mounted to a portion of the vehicle above the passenger and configured to be unfolded toward the front of the passenger; a seat detector configured to detect a seating posture of the passenger; and a controller configured to control unfolding of the front airbag or the upper airbag on the basis of the passenger's seating posture detected by the seat detector.

12 Claims, 9 Drawing Sheets

(51) Int. Cl.
  *B60R 21/015* (2006.01)
  *B60R 21/231* (2011.01)
  *B60R 21/01* (2006.01)
  *B60R 21/26* (2011.01)
  *B60R 21/00* (2006.01)

(56) References Cited

U.S. PATENT DOCUMENTS

2003/0218319 A1* 11/2003 Amamori .......... B60R 21/01512
  280/729
2020/0122665 A1* 4/2020 Shin .................. B60R 21/233
2020/0180537 A1* 6/2020 Choi ................... B60R 21/21
2021/0024027 A1* 1/2021 Kanegae ............. B60R 21/239
2021/0284096 A1* 9/2021 Freisler ............... B60R 21/232

FOREIGN PATENT DOCUMENTS

JP    2020015424 A  *  1/2020
KR    10-1756005 A     7/2017

* cited by examiner

VEHICLE AIRBAG SYSTEM AND CONTROL METHOD

CROSS-REFERENCE TO RELATED APPLICATIONS

The present application claims priority to Korean Patent Application No, 10-2020-0107334, filed Aug. 25, 2020, the entire contents of which is incorporated herein for all purposes by this reference.

BACKGROUND OF THE INVENTION

1. Field of the Invention

The present invention relates to a vehicle airbag system and a control method and, more particularly, to a vehicle airbag system and a control method controlling a front airbag and an upper airbag mounted in a vehicle.

2. Discussion of Related Art

As interest in the safely of a passenger increases along with the functionality and the convenience of a vehicle, importance of a safety-related device capable of protecting a passenger in a vehicle accident has been increased, Among the safety devices for protecting a passenger, an airbag system is the most basic protection device for reducing impact to the passenger in a vehicle accident.

Among airbag systems, the most basic device is a front airbag. The front airbag is located in front of the passenger to prevent a direct collision between the passenger and an object of the vehicle interior during a vehicle accident and to block impact energy transmitted from the outside of the vehicle.

The conventional front airbag is mounted in front of the passenger and may protect the front of the passenger during a vehicle collision.

However, with the development of autonomous vehicle driving, various seating postures, such as a relax mode in which a passenger's upper body is inclined or a long-sliding mode in which the seat is moved rearward, of a passenger who is seated on a seat while changing an angle or a location of the seat are being developed, so only the conventional front airbag cannot protect the front of the passenger.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to mount a front airbag in a dashboard of a vehicle and an upper airbag in a head lining of the vehicle to protect the front of a passenger even when the passenger is in any seating posture of a seat.

According to the present invention, a vehicle airbag system includes: a front airbag mounted to a portion of a vehicle in front of a passenger and configured to deploy toward a front of the passenger; an upper airbag mounted to a portion of the vehicle above the passenger and configured to deploy toward the front of the passenger; a seat detector configured to detect a seating posture of the passenger; and a controller configured to control unfolding of the front airbag or the upper airbag on the basis of the passenger's seating posture detected by the seat detector.

The seat detector may include: a location detecting part configured to detect a sliding location of a seat with respect to a longitudinal direction of the vehicle.

The front airbag may be mounted to a dashboard, and when the location detecting part detects that a dashboard-to-seat distance detected by the location detecting part is equal to or longer than a preset distance, the controller may control both the front airbag and the upper airbag to be activated during a vehicle collision.

The seat detector may include: an angle detecting part configured to detect a tilting angle of a seatback.

When the angle detecting part detects that a seatback angle detected by the angle detecting part is less than a first preset angle, the controller may control the front airbag to be activated during a vehicle collision.

When the angle detecting part detects that a seatback angle detected by the angle detecting part is equal to or larger than a first preset angle and less than a second preset angle, the controller may control both the front airbag and the upper airbag to be activated.

The seat detector may include: a location detecting part configured to detect a sliding location of a seat with respect to a longitudinal direction of the vehicle; and an angle detecting part configured to detect a tilting angle of a seatback, and when the location detecting part detects that a dashboard-to-seat distance detected by the location detecting part is equal to or longer than a preset distance and a seatback angle detected by the angle detecting part is equal to or larger than a second preset angle, the controller may control only the upper airbag to be activated.

The vehicle airbag system may include: a sliding device mounted to a head lining of the vehicle and configured to slide the upper airbag along a rail in a longitudinal direction of the vehicle, wherein the controller may be configured to control the sliding device, so that the upper airbag may be moved in response to the passenger's seating posture detected by the seat detector.

When the seat detector may detect that the passenger's seating posture may be a normal driving posture in which an upper body of the passenger may be directed upward, the controller may control only the front airbag to be activated.

When the seat detector detects that the passenger's seating posture is in a relax mode in which an upper body of the passenger is reclined or a long-sliding mode in which a seat is moved to the rear in the vehicle, the controller may control both the front airbag and the upper airbag to be activated.

When both the front airbag and the upper airbag are unfolded simultaneously, the front airbag and the upper airbag may be brought into contact with each other and the upper airbag may be supported while surrounding the front airbag at a contact portion between the front airbag and the upper airbag.

When the seat detector detects that the passenger's seating posture is in a sleeping mode in which an upper body of the passenger is arranged in a direction parallel to a longitudinal direction of the vehicle, the controller may control only the upper airbag to be deployed.

The upper airbag may include: a first inflator configured to inject airbag gas; and a second inflator configured to additionally inject the airbag gas so that volume of the upper airbag is further increased, and when the seat detector detects that the passenger's seating posture is in a sleeping mode, the controller may operate the first inflator and the second inflator to increase the volume of the upper airbag.

A control method of a vehicle airbag may include: detecting a location of a vehicle seat or a tilting angle of a seatback; determining a seating posture of a passenger on the basis of the location of the vehicle seat or the tilting angle of the seatback detected in the detecting; and controlling, on the basis of the passenger's seating posture determined in the determining, a front airbag mounted to a portion of a vehicle in front of the passenger and configured to deploy toward a front of the passenger or an upper airbag mounted to a portion of the vehicle above the passenger and configured to deploy toward the front of the passenger.

In the determining, when the passenger's seating posture is determined as in a normal driving posture in which an upper body of the passenger is directed upward, the controlling may include: first controlling, wherein only the front airbag may be controlled to be activated.

In the determining, when the passenger's seating posture is determined as in a relax mode in which an upper body of the passenger is reclined or a long-sliding mode in which the seat is moved rearward, the controlling may include: second controlling, wherein the front airbag and the upper airbag may be controlled to be deployed.

In the determining, when the passenger's seating posture is determined as in a sleeping mode in which an upper body of the passenger is arranged in a direction parallel to a longitudinal direction of the vehicle, the controlling may include thirdly controlling only the upper airbag to be deployed.

According to the present invention, in the normal driving posture in which the passenger's seating posture faces forward, the controller operates only the front airbag so that the front of the passenger can be protected.

In the relax mode in which the passenger's upper body is reclined or the long-sliding mode in which the seat is moved rearward in the vehicle, the controller unfolds both the front airbag and the upper airbag, so that the front of the passenger can be protected.

In the sleeping mode in which the passenger's upper body is arranged parallel to the longitudinal direction of the vehicle, the controller unfolds only the upper airbag and operates both the first inflator and the second inflator of the upper airbag to restrict the passenger who is lying down, so that the front of the passenger can be protected.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

In the following description, the structural or functional description specified to an exemplary embodiment according to the concept of the present invention is intended to describe the exemplary embodiments, so it should be understood that the present invention may be variously embodied, without being limited to the exemplary embodiment.

An embodiment described herein may be changed in various ways and various shapes, so a specific embodiment is shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first anchor second, etc. may be used herein to describe various elements, these elements should not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment will be described hereafter in detail with reference to the accompanying drawings. Like reference numerals given in the drawings indicate like components.

Figure 1:
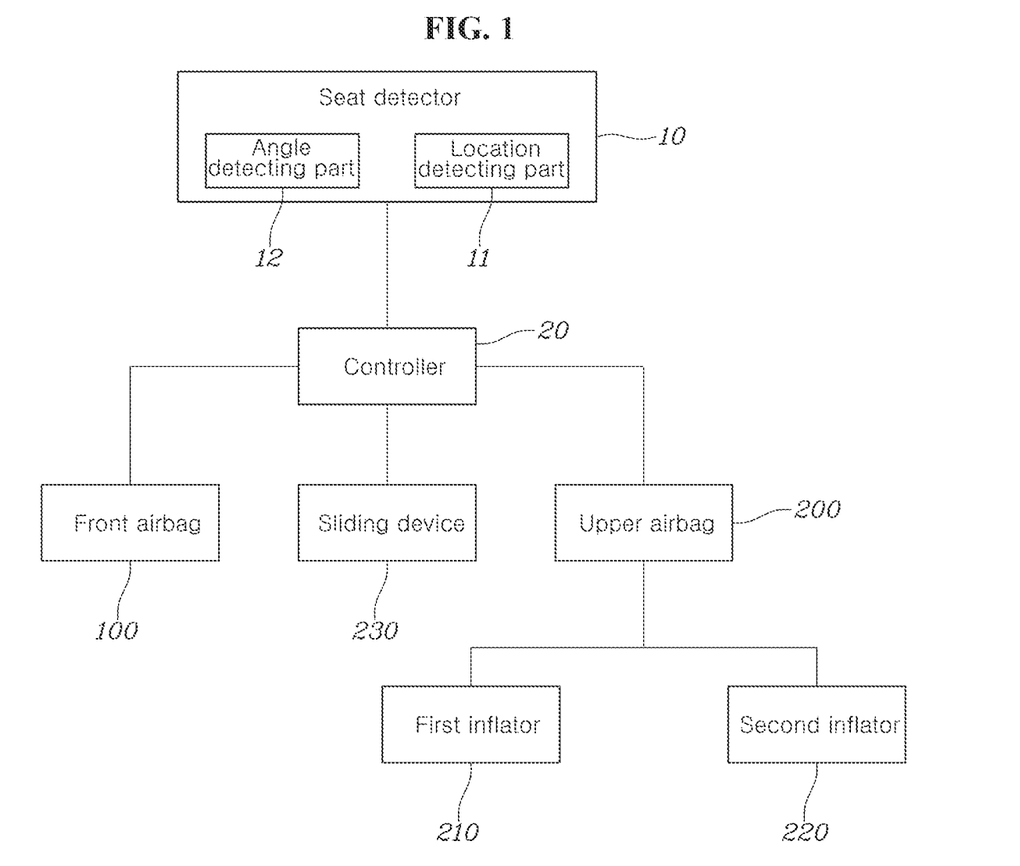
FIG. 1 is a block diagram of a vehicle airbag system according to an embodiment of the present invention.

According to the exemplary embodiment of the present invention, a seat detector 10, an angle detecting part 11, a location detecting part 12, and a controller 20 may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. The memory and processor may be realized as separate chips. Alternately, the memory and processor may be realized as an integrated single chip. The processor may have one or more form.

Referring to FIGS. 1 to 8, a vehicle airbag system according to a preferred embodiment of the present invention will be described.

A conventional vehicle airbag is mounted to a portion of a vehicle at front of a passenger and can protect the passenger only when the passenger is in a normal driving posture in which the upper body of the passenger is directed upward.

The vehicle airbag system according to the present invention is developed to protect the front of the passenger even when a seat 600 is in any seating posture.

An airbag cushion of the vehicle airbag system according to the present invention may be changed in volume depending on a kind of vehicle model. The airbag cushion may be mounted to the optimum location in which the passenger can be protected by the unfolded airbag cushion while a mounting location thereof is partially moved.

The vehicle airbag system according to the present invention is possible for the passenger to enjoy more the interior space of the vehicle with a vehicle dashboard 400 formed slim. To prepare for difficulty in protecting the front of the passenger generated by volume limitation of a front airbag 100 mounted in the dashboard 400 formed slim, an upper airbag 200 mounted in a head lining 300 may be provided in duplicate to protect the passenger.

In the drawings, only the head lining 300 is visible, but a roof panel may be provided above the head lining 300.

FIG. 1 is a block diagram of the vehicle airbag system according to the embodiment of the present invention.

The vehicle airbag system according to the present invention includes: the front airbag 100 mounted to a portion of the vehicle in front of the passenger and configured to deploy toward a front of the passenger; the upper airbag 200 mounted to a portion of the vehicle above the passenger and configured to deploy toward the front of the passenger; the seat detector 10 configured to detect a seating posture of the passenger; and the controller 20 configured to control unfolding of the front airbag 100 or the upper airbag 200 on the basis of the passenger's seating posture detected by the seat detector 10.

Referring to FIG. 1, the front airbag 100 is mounted in the dashboard 400 and is unfolded from a portion between the dashboard 400 and a windshield 500 toward a front of the passenger during a vehicle collision, so that the front of the passenger may be protected by the front airbag 100.

The upper airbag 200 is mounted in a roof or the head lining 300 of the vehicle and is unfolded downward during a vehicle collision. Therefore, the front of the passenger may be protected by the upper airbag when the front of the passenger is not protected due to the volume limitation of the front airbag 100 during rearward moving of the passenger's upper body.

The seat detector 10 may detect a longitudinal movement of the seat 600 or a tilting angle of a seatback 610 of the seat 600 to detect the passenger's seating posture.

The seat detector 10 may detect the seating posture of the seat 600 through a camera sensor mounted in the vehicle.

The controller 20 may control unfolding of the front airbag 100 and the upper airbag 200 on the basis of the location of the seat 600 or the angle of the seatback 610 detected by the seat detector 10.

Therefore, the front of the passenger may be protected during a vehicle collision even when the passenger takes any seating posture.

Figure 2:
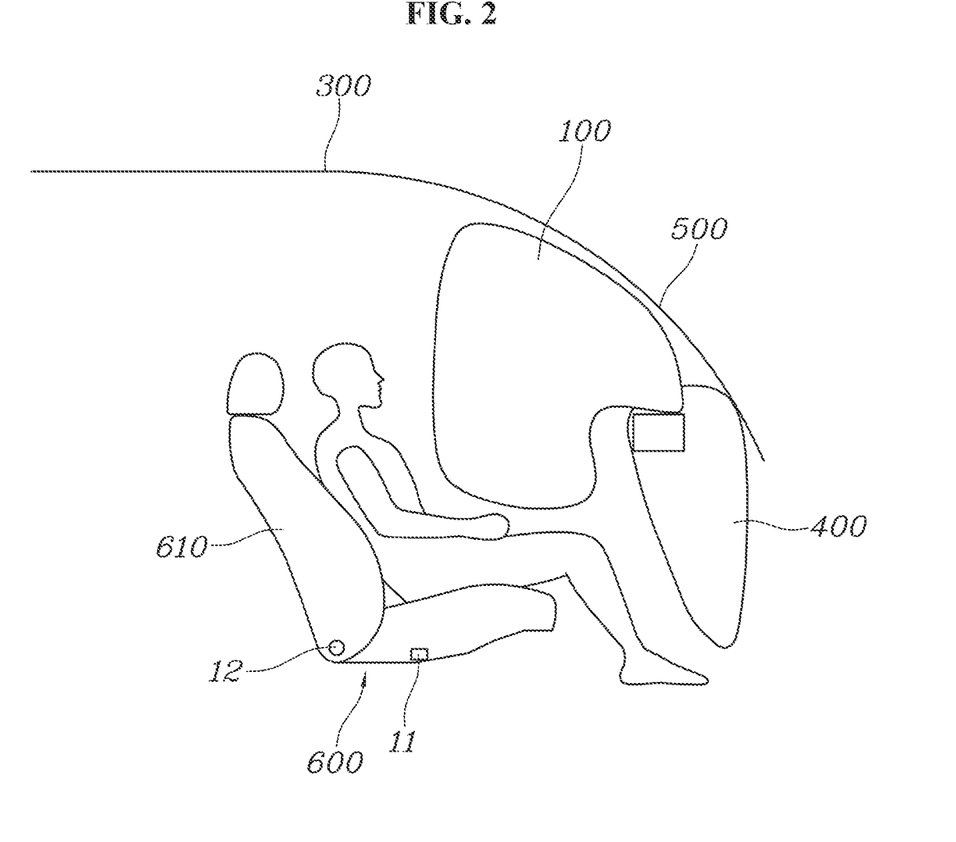
FIG. 2 is a side view showing an unfolded front airbag of the vehicle airbag system according to the embodiment of the present invention.

FIG. 2 is a side view showing the unfolded front airbag 100 of the vehicle airbag system according to the embodiment of the present invention.

The seat detector 10 includes the location detecting part 11 detecting a sliding location of the seat 600 with respect to a longitudinal direction of the vehicle. The location detecting part 11 may be further configured to detect a distance between the dashboard 400 and the seat 600.

The location detecting part 11 may detect a longitudinal movement of the seat 600 by a location sensor mounted in the seat 600, Location data of the seat 600 is transmitted to the controller 20 and the controller 20 may control unfolding of the front airbag 100 or the upper airbag 200 in response to the location of the seat 600.

The seat detector 10 includes the angle detecting part 12 detecting a tilting angle of the seatback 610.

By an angle sensor mounted in the seatback 610 of the vehicle, the angle detecting part 12 may detect the tilting angle of the seatback 610. Angle data of the seatback 610 is transmitted to the controller 20 and the controller 20 may control unfolding of the front airbag 100 or the upper airbag 200 in response to the angle of the seatback 610.

Figure 3:
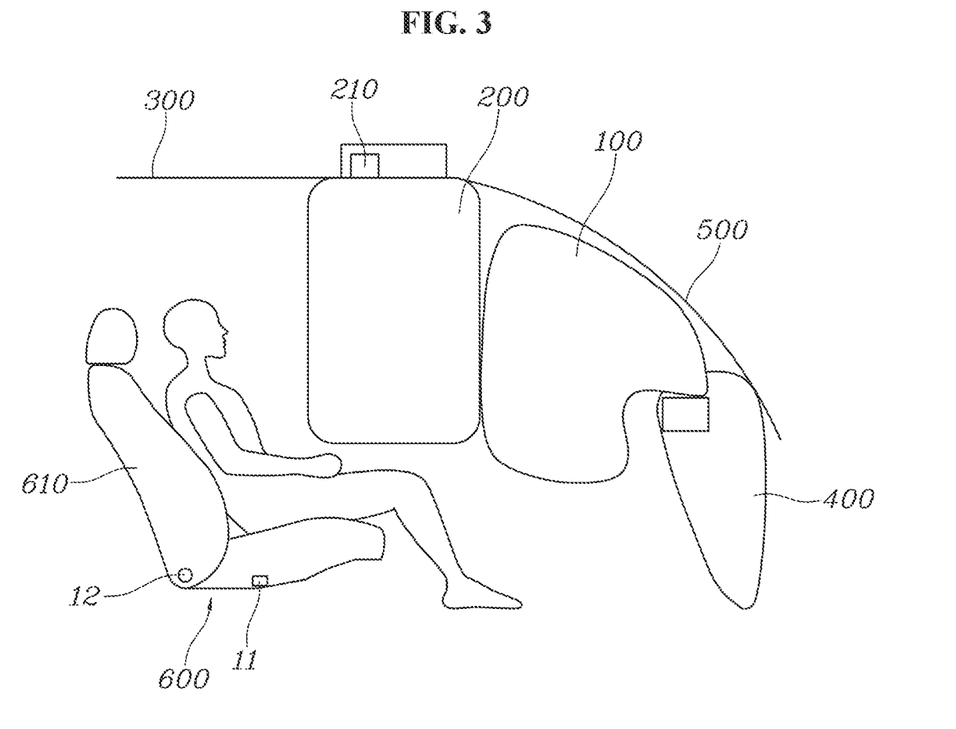
FIG. 3 is a side view showing the unfolded front airbag and an unfolded upper airbag of the vehicle airbag system according to the embodiment of the present invention when a seat is in a long-sliding mode.

The front airbag 100 is mounted in the dashboard 400. When it is determined that a dashboard-to-seat distance detected by the location detecting part 11 is equal to or longer than a preset distance, the controller 20 controls the front airbag 100 and the upper airbag 200 so that both the front airbag 100 and the upper airbag 200 are activated during a vehicle collision.

The front airbag 100 is mounted in the dashboard 400 and the location detecting part 11 may detect that the dashboard-to-seat distance is equal to or longer than the preset distance, and then the controller 20 may allow the front airbag 100 and the upper airbag 200 to be deployed during a vehicle collision.

When the location of the seat 600 is moved rearward, the front airbag 100 alone does not protect the front of the passenger. Therefore, the controller 20 controls both the front airbag 100 and the upper airbag 200 to be activated at the same time.

Therefore, the front of the passenger can be safely protected even when the seat 600 is moved rearward.

When it is determined that the seatback angle detected by the angle detecting part is less than a first preset angle, the controller 20 controls the front airbag 100 to be activated during a vehicle collision.

The first preset angle is an angle at which the seatback 610 faces upward and the passenger looks forward, and the first preset angle may be preset by a system designer.

When the angle detecting part 12 detects that the angle of the seatback 610 of the vehicle is less than the first preset angle, the upper body of the passenger is directed upward and is near the dashboard 400. Accordingly, the controller 20 unfolds the front airbag 100 on the basis of the angle data detected by the angle detecting part 12.

Therefore, the front of the passenger can be protected during a vehicle collision.

Figure 4:
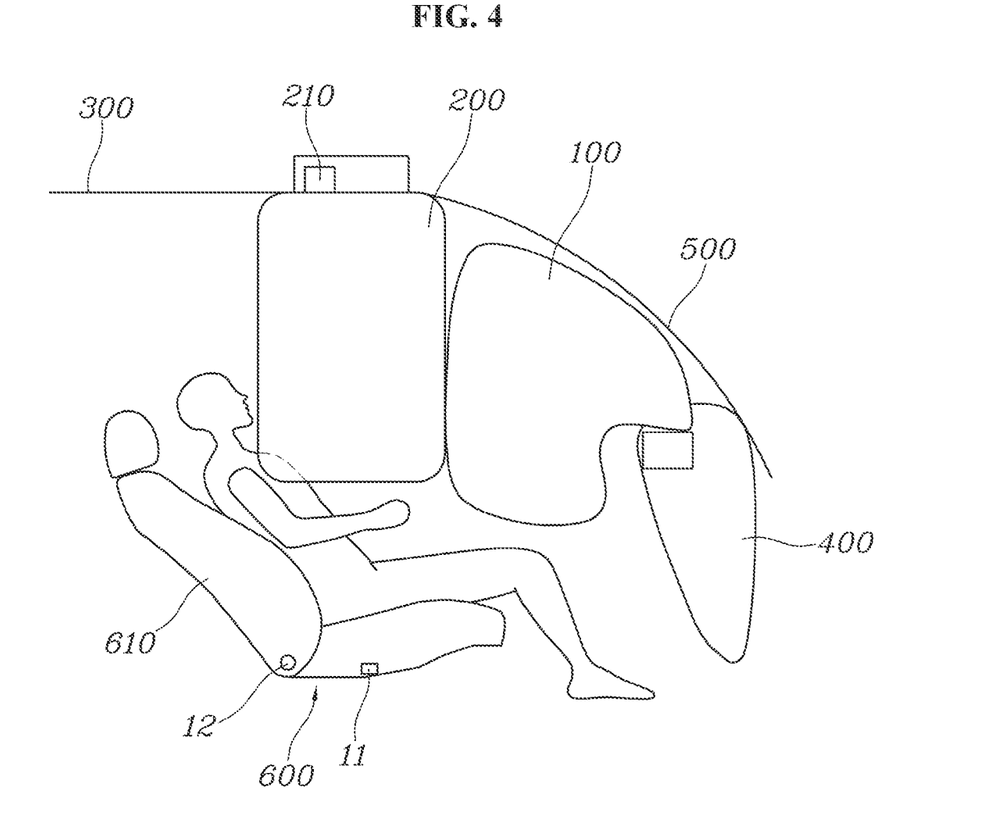
FIG. 4 is a side view showing the unfolded front airbag and the unfolded upper airbag of the vehicle airbag system according to the embodiment of the present invention when the seat is in a relax mode.

When the angle detecting part 12 detects that the angle of the seatback 610 is equal to or larger than the first preset angle and less than a second preset angle, the controller 20 controls the front airbag 100 and the upper airbag 200 to be activated.

The second preset angle is an angle at which the seatback 610 is reclined and the upper body of the passenger is reclined, and may be preset by the system designer.

When the angle detecting part 12 detects that the angle of the seatback 610 of the vehicle is equal to or larger than the first preset angle and less than the second preset angle, the upper body of the passenger is in a rearward moved state and a state away from the dashboard 400. Accordingly, the controller 20 unfolds the front airbag 100 and the upper airbag 200 on the basis of the angle data detected by the angle detecting part 12.

Therefore, the front of the passenger can be protected during a vehicle collision.

Figure 5:
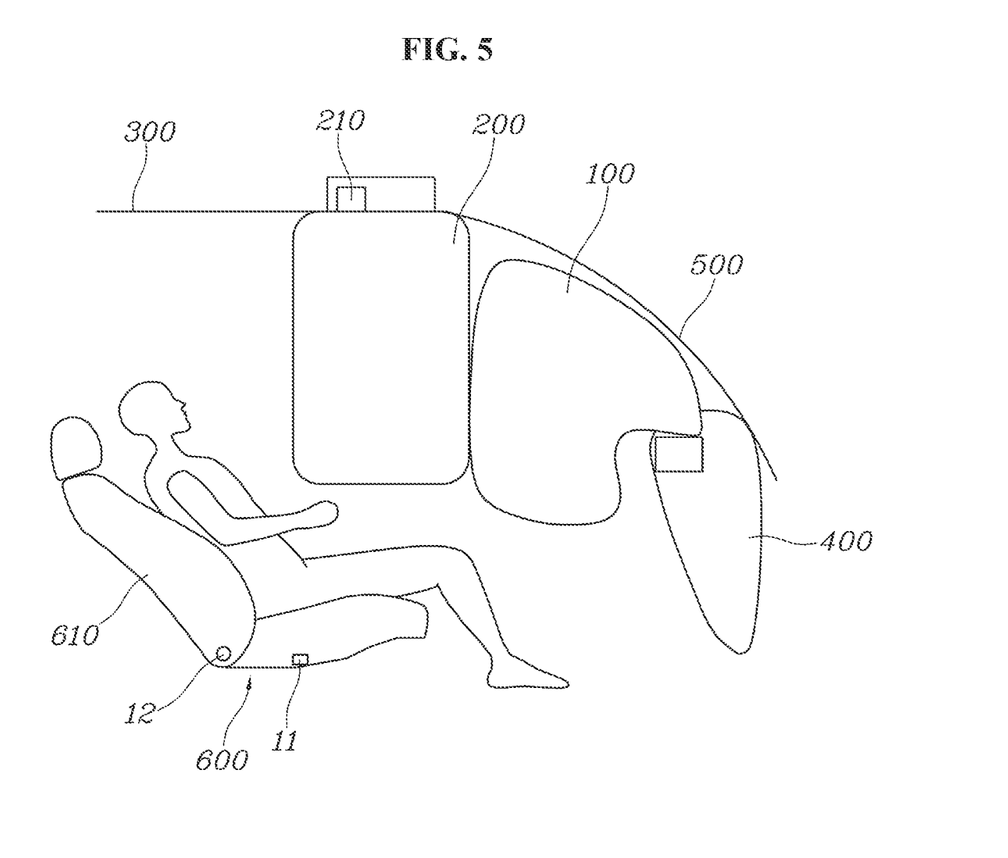
FIG. 5 is a side view showing the unfolded front airbag and the unfolded upper airbag of the vehicle airbag system according to the embodiment of the present invention when the seat is in a long-sliding and relax mode.
Figure 7:
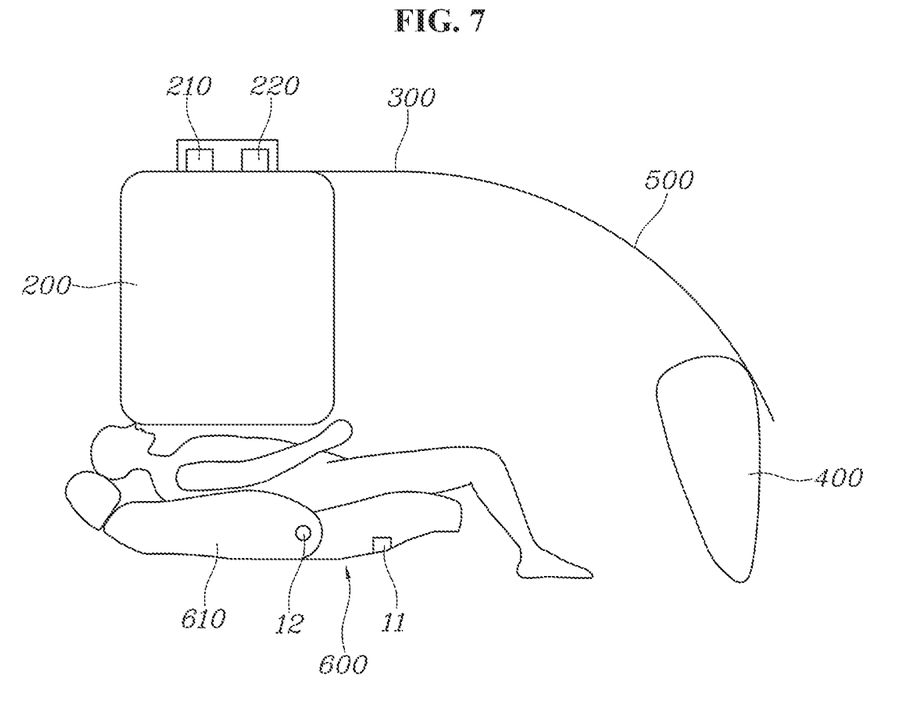
FIG. 7 is a side view showing the unfolded upper airbag of the vehicle airbag system according to the embodiment of the present invention when the seat is in a sleeping mode.

The seat detector 10 includes the location detecting part 11 detecting the sliding location of the seat 600 with respect to the longitudinal direction of the vehicle and the angle detecting part 12 detecting the tilting angle of the seatback 610. When the location detecting part 11 detects that the dashboard-to-seat distance is equal to or longer than the preset distance and the angle detecting part 12 detects that the seatback angle is equal to or larger than the second preset angle, the controller 20 controls only the upper airbag 200 to be activated.

When the seatback 610 tilts more than the second preset angle, the upper body of the passenger is arranged parallel to the longitudinal direction of the vehicle and the passenger lies.

When the angle detecting part 12 detects that the seatback angle is equal to or larger than the second preset angle, the upper body of the passenger is arranged in the direction parallel to the longitudinal direction of the vehicle and the front airbag 100 cannot touch the passenger. The controller 20 unfolds the upper airbag 200 on the basis of the angle data detected by the angle detecting part 12.

Therefore, the upper airbag 200 is unfolded so as to support the upper body of the passenger lying and to restrict the upper body of the passenger, whereby the passenger can be protected.

Figure 8:
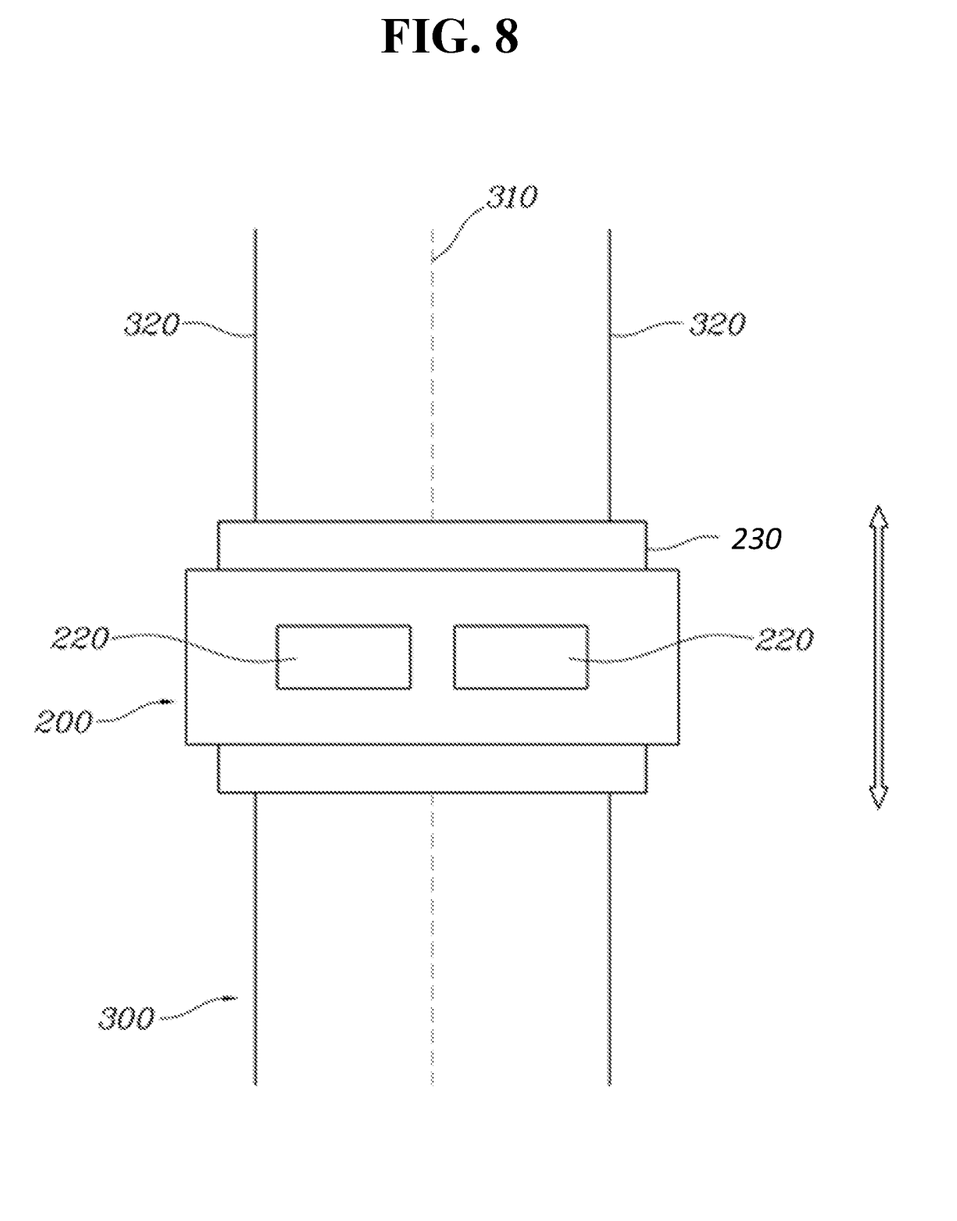
FIG. 8 is a plan view showing a sliding device of the upper airbag and a rail of the vehicle airbag system according to the embodiment of the present invention.

The vehicle airbag system includes a sliding device 230 mounted to the head lining 300 and sliding the upper airbag 200 along a rail 320 in the longitudinal direction of the vehicle. The controller 20 controls the sliding device 230 so that the upper airbag 200 is moved in response to the passenger's seating posture detected by the seat detector 10.

The sliding device 230 moves the upper airbag 200 in the longitudinal direction of the vehicle under the control of the controller 20. When both the upper airbag 200 and the front airbag 100 are unfolded at the same time, the sliding device 230 locates the upper airbag. 200 in the front of the vehicle. Then, the upper airbag 200 and the front airbag 100 are brought into contact with each other during unfolding so that the upper airbag 200 may support the front airbag 100.

When the angle detecting part 12 detects that the seatback angle is equal to or larger than the second preset angle or the seat detector 10 detects that the seating posture is in a sleeping mode in which the upper body of the passenger is arranged in the direction parallel to the longitudinal direction of the vehicle, the controller 20 controls the sliding device 230, so that the upper airbag 200 is moved rearward and may restrict the upper body of the passenger during unfolding thereof.

The upper airbag 200 is unfolded while tearing a tear seam 310 of the head lining 300. Therefore, the upper airbag 200 may be deployed at any location even when being moved in the longitudinal direction of the vehicle.

There is an effect of protecting the front of the passenger more safely.

The seat detector 10 detects that the passenger's seating posture is in the normal driving posture in which the passenger's upper body is directed upward, the controller 20 controls only the front airbag 100 to be deployed.

By a detecting sensor such as a camera sensor mounted in the vehicle, when the seat detector 10 detects that the seating posture of the seat 600 is in the normal driving posture in which the passenger looks forward and the passenger's upper body is directed upward, the controller 20 controls only the front airbag 100 to be activated. At this time, the upper airbag 200 is not unfolded so it is possible to prevent the head of the passenger from being injured due to hitting by the upper airbag 200.

The seat detector 10 detects that the passenger's seating posture is in a relax mode in which the passenger's upper body is reclined or a long-sliding mode in which the seat 600 is moved to the rear in the vehicle, the controller 20 controls both the front airbag 100 and the upper airbag 200 to be deployed.

By the detecting sensor such as the camera sensor mounted in the vehicle, when the seat detector 10 detects that the seating posture is in the relax mode in which the passenger's upper body is reclined or the long-sliding mode in which the seat 600 is moved to the rear in the vehicle, the controller 20 may unfold both the front airbag 100 and the upper airbag 200 at the same time. Then, both the front airbag 100 and the upper airbag 200 fill a wide open space in front of the passenger, whereby the front of the passenger can be protected.

Figure 6:
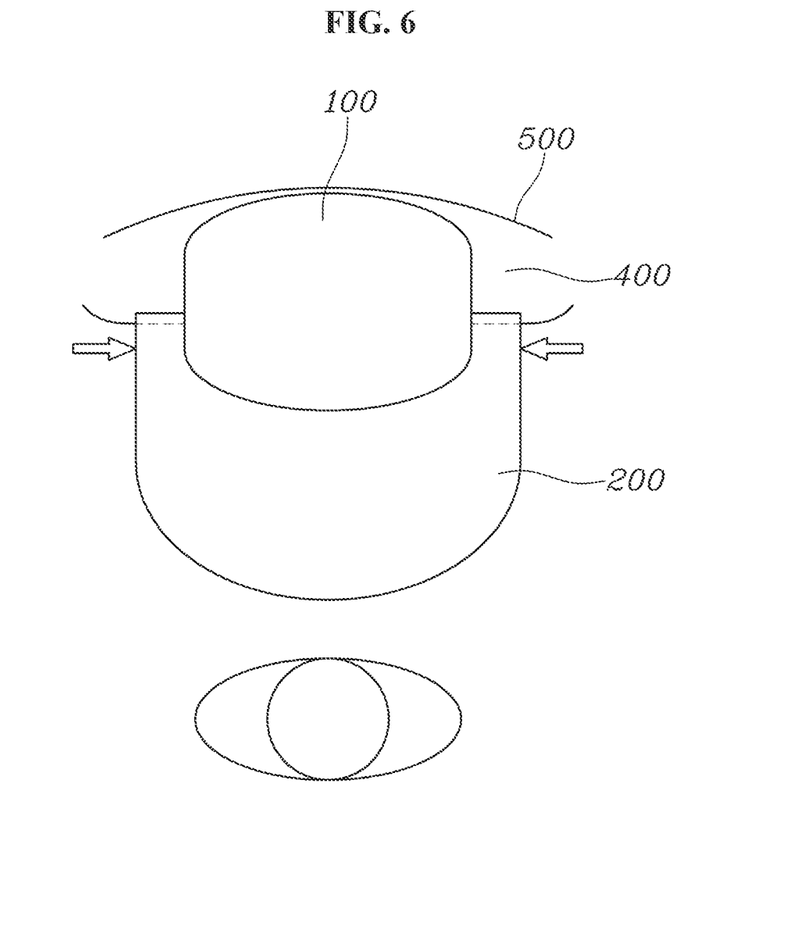
FIG. 6 is a plan view showing the unfolded front airbag and the unfolded upper airbag of the vehicle airbag system according to the embodiment of the present invention.

When both the front airbag 100 and the upper airbag 200 are unfolded at the same time, the front airbag 100 and the upper airbag 200 are brought into contact with each other. In addition, at a contact portion between the front airbag 100 and the upper airbag 200, the upper airbag 200 is supported while surrounding the front airbag 100.

As shown in FIG. 6, the front airbag 100 and the upper airbag 200 are brought into contact with each other, and the upper airbag 200 is supported to a front surface of the front airbag 100 to prevent a longitudinal movement thereof.

Accordingly, the upper airbag 200 may not be moved in the longitudinal direction of the vehicle and protect the passenger more safely.

The upper airbag 200 may be fixed while surrounding the front airbag 100 in a direction toward the front airbag 100 at the contact portion between the upper airbag 200 and the front airbag 100.

Accordingly, the upper airbag 200 is supported not to be moved in a lateral direction of the vehicle.

When the seat detector 10 detects that the passenger's seating posture is in the sleeping mode in which the passenger's upper body is arranged in the direction parallel to the longitudinal direction of the vehicle, the controller 20 controls only the upper airbag 200.

When the seat detector 10 detects that the passenger's seating posture is in the sleeping mode in which the passenger's upper body is arranged in the direction parallel to the longitudinal direction of the vehicle, the controller 20 controls the sliding device 230 to locate the upper airbag 200 to the rear in the vehicle. In addition, the upper airbag 200 is unfolded in response to a changed location of the seat 600 so that the front of the passenger may be protected even when the passenger is lying down.

The upper airbag 200 includes: a first inflator 210 injecting airbag gas; and a second inflator 220 additionally injecting the airbag gas so that the volume of the upper airbag 200 is further increased. When the seat detector 10 detects that the passenger's seating posture is in the sleeping mode, the controller 20 operates the first inflator 210 and the second inflator 220 to increase the volume of the upper airbag 200.

When the upper airbag 200 is unfolded with the front airbag 100 at the same time, only the first inflator 210 explodes to protect the front of the passenger. When the passenger's seating posture is in the sleeping mode and only the upper airbag 200 is unfolded, the first inflator 210 and the second inflator 220 explode at the same time. The airbag gas is injected into the upper airbag 200 to increase the volume of the upper airbag 200 so that the upper airbag 200 may support and restrict the passenger's upper body.

Therefore, it is possible to prevent an injury to the passenger's upper body caused when the passenger's upper body is moved and hits an object in the vehicle interior.

Figure 9:
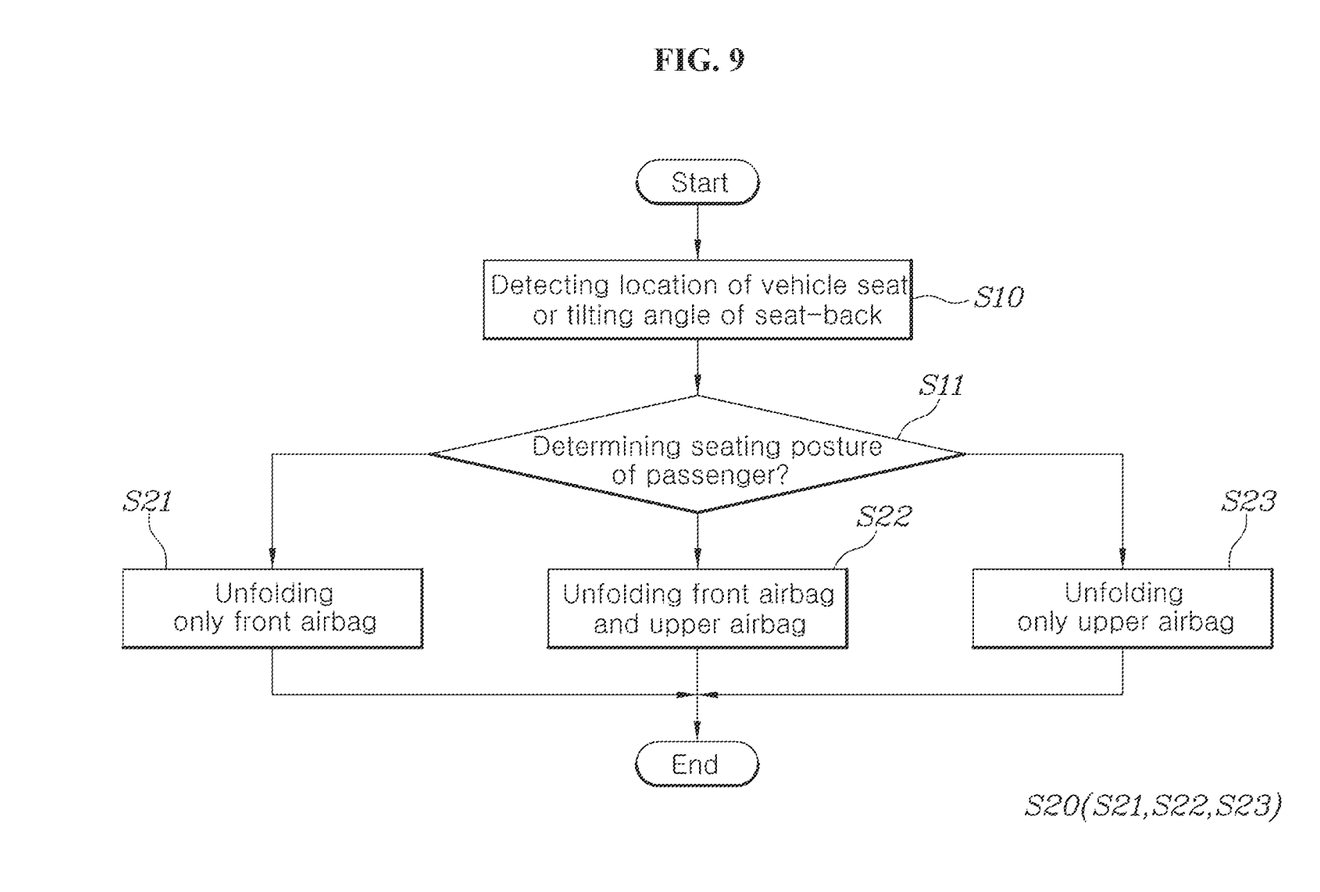
FIG. 9 is a flowchart showing a control method of a vehicle airbag according to an embodiment of the present invention.

A control method of a vehicle airbag according to the present invention includes: detecting S10 a location of the vehicle seat 600 or a tilting angle of the seatback 610; determining S11 a passenger's seating posture on the basis of the location of the seat 600 or the tilting angle of the seatback 610 detected in the detecting S10; and controlling, on the basis of the passenger's seating posture determined in the determining S11, the front airbag 100 mounted to the portion of the vehicle at a front of the passenger and unfolded toward the front of the passenger or the upper airbag 200 mounted to the portion of the vehicle above the passenger and unfolded toward the front of the passenger.

In the determining S11, when the seating posture is determined as in the normal driving posture in which the passenger's upper body is directed upward, the controlling includes first controlling S21. In the first controlling S21, only the front airbag 100 is controlled to be deployed.

In the determining S11, when the passenger's seating posture is determined as in the relax mode in which the passenger's upper body is reclined or the long-sliding mode in which the seat 600 is moved rearward, the controlling includes second controlling S22. In second controlling S22, the front airbag 100 and the upper airbag 200 are controlled to be deployed.

In the determining S11, when the passenger's seating posture is determined as in the sleeping mode in which the passenger's upper body is arranged parallel to the longitudinal direction of the vehicle, the controlling includes third controlling S23. In the third controlling S23, only the upper airbag 200 is controlled to be activated.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A vehicle airbag system comprising:
a front airbag positioned in front of a passenger of a vehicle and configured to deploy toward a front of the passenger;
an upper airbag positioned above the passenger and configured to deploy toward the front of the passenger;
a seat detector configured to detect a seating posture of the passenger; and
a controller configured to control unfolding of the front airbag or the upper airbag based on the detected seating posture of the passenger,
wherein the controller is configured to activate only the upper airbag when the detected seating posture of the passenger indicates that the passenger is in a sleeping mode in which an upper body of the passenger is parallel to a longitudinal direction of the vehicle.

2. The vehicle airbag system of claim 1, wherein the seat detector comprises a location detecting part configured to detect a sliding location of a seat of the vehicle with respect to a longitudinal direction of the vehicle.

3. The vehicle airbag system of claim 2, wherein:
the front airbag is mounted to a dashboard of the vehicle,
the location detecting part is further configured to detect a distance between the dashboard and the seat, and
the controller is further configured to activate, upon detecting a collision of the vehicle, both the front airbag and the upper airbag when the detected distance between the dashboard and the seat is equal to or greater than a preset distance.

4. The vehicle airbag system of claim 1, wherein the seat detector comprises an angle detecting part configured to detect a tilting angle of a seatback of the vehicle.

5. The vehicle airbag system of claim 4, wherein the controller is further configured to activate, upon detecting a collision of the vehicle, the front airbag when the detected tilting angle of the seatback is less than a preset angle.

6. The vehicle airbag system of claim 4, wherein the controller is further configured to activate, upon detecting a collision of the vehicle, both the front airbag and upper airbag when the detected tilting angle of the seatback is equal to or greater than a first preset angle and less than a second preset angle.

7. The vehicle airbag system of claim 1, wherein:
the seat detector comprises:
a location detecting part configured to detect a sliding location of a seat of the vehicle with respect to a longitudinal direction of the vehicle, and a distance between a dashboard of the vehicle and the seat; and
an angle detecting part configured to detect a tilting angle of a seatback of the vehicle, and
the controller is further configured to activate, upon detecting a collision of the vehicle, only the upper airbag when the detected distance between the dashboard and the seat is equal to or longer than a preset distance and the detected tilting angle of the seatback is equal to or larger than a preset angle.

8. The vehicle airbag system of claim 1, further comprising a sliding device mounted to a head lining of the vehicle and configured to slide the upper airbag in a longitudinal direction of the vehicle,
wherein the controller is further configured to control the sliding device to move the upper airbag based on the detected seating posture of the passenger.

9. The vehicle airbag system of claim 1, wherein the controller is further configured to activate, upon detecting a collision of the vehicle, only the front airbag when the detected seating posture of the passenger indicates that the passenger is in a normal driving posture in which an upper body of the passenger is directed upward.

10. The vehicle airbag system of claim 1, wherein the controller is further configured to activate, upon detecting a collision of the vehicle, both the front airbag and the upper airbag simultaneously when the detected seating posture of the passenger indicates that the passenger is in one of a plurality of modes comprising:
   a relax mode in which an upper body of the passenger is reclined; and
   a long-sliding mode in which a seat is moved to the rear in the vehicle.

11. The vehicle airbag system of claim 10, wherein, when both the front airbag and the upper airbag are activated simultaneously, the front airbag and the upper airbag are configured to contact with each other, and the upper airbag is configured to surround the front airbag and to be supported by the front airbag at a contact portion between the front airbag and the upper airbag.

12. A vehicle airbag system comprising:
   a front airbag positioned in front of a passenger of a vehicle and configured to deploy toward a front of the passenger;
   an upper airbag positioned above the passenger and configured to deploy toward the front of the passenger;
   a seat detector configured to detect a seating posture of the passenger; and
   a controller configured to control unfolding of the front airbag or the upper airbag based on the detected seating posture of the passenger,
   wherein, when both the front airbag and the upper airbag are activated simultaneously, the front airbag and the upper airbag are configured to contact with each other, and the upper airbag is configured to surround the front airbag and to be supported by the front airbag at a contact portion between the front airbag and the upper airbag,
   wherein the controller is further configured to activate, upon detecting a collision of the vehicle, both the front airbag and the upper airbag simultaneously when the detected seating posture of the passenger indicates that the passenger is in one of a plurality of modes comprising:
   a relax mode in which an upper body of the passenger is reclined; and
   a long-sliding mode in which a seat is moved to the rear in the vehicle,
   wherein the upper airbag comprises:
      a first inflator configured to inject airbag gas when the upper airbag is deployed; and
      a second inflator configured to inject additional airbag gas to increase a volume of the upper airbag when the upper airbag is deployed, and
   wherein the controller is further configured to activate the first and second inflators when the detected seating posture of the passenger indicates that the passenger is in a sleeping mode in which an upper body of the passenger is parallel to a longitudinal direction of the vehicle.

* * * * *